Figure 1:
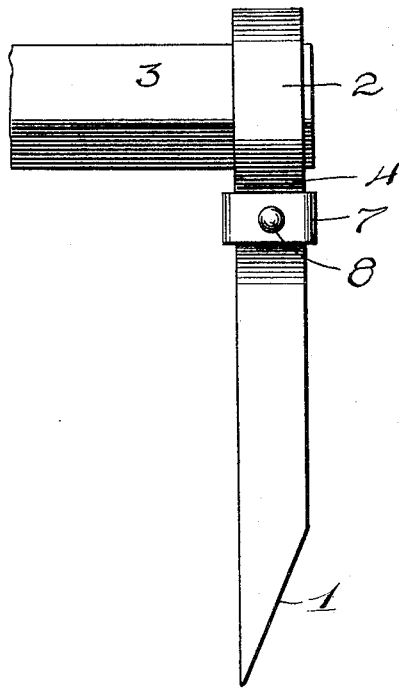

J. WAROCZKY.
COMPOUND HOE.
APPLICATION FILED AUG. 13, 1913.

1,110,089.

Patented Sept. 8, 1914.

WITNESSES
Samuel Payne
Karl H. Butler

INVENTOR
J. Waroczky
By Henry C. Evert
ATTORNEY

UNITED STATES PATENT OFFICE.

JOHN WAROCZKY, OF DUQUESNE, PENNSYLVANIA.

COMPOUND HOE.

1,110,089.  Specification of Letters Patent.  Patented Sept. 8, 1914.

Application filed August 13, 1913. Serial No. 784,647.

*To all whom it may concern:*

Be it known that I, JOHN WAROCZKY, a subject of the King of Hungary, residing at Duquesne, in the county of Allegheny and State of Pennsylvania, have invented certain new and useful Improvements in Compound Hoes, of which the following is a specification, reference being had therein to the accompanying drawing.

This invention relates to compound hoes, and the primary object of my invention is to provide a simple and inexpensive compound hoe that can be used for grubbing and agricultural purposes.

A further object of this invention is to provide a strong and durable compound hoe made practically of a single piece of material to form two tines that are rigid and highly efficient for tilling the soil.

I attain the above objects by a mechanical construction that will be hereinafter specifically described and then claimed, and reference will now be had to the drawing, wherein:—

Figure 2:
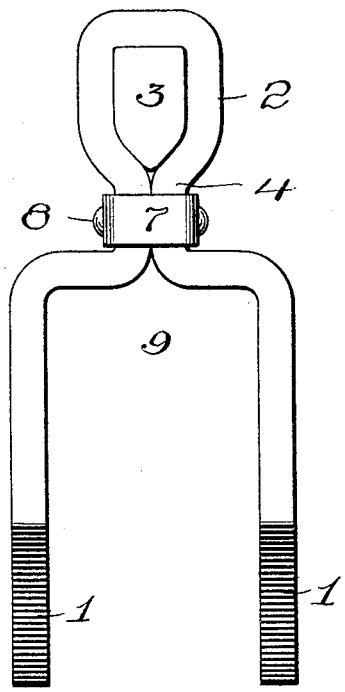
Figure 3:
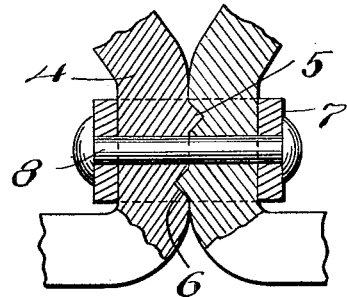

Figure 1 is a side elevation of the compound hoe, Fig. 2 is a front elevation of the same, and Fig. 3 is an enlarged sectional view of a portion of the compound hoe.

A compound hoe in accordance with this invention is made from a flat bar, cut a prescribed length and the ends of the bar are beveled, as at 1. The flat bar is bent upon itself to form a loop or head 2 adapted to receive the end of a handle 3. In forming the loop 2, the sides of the bar are brought together to form a neck 4 and the confronting sides of the bar are interlocked by providing the confronting sides of the bar with ribs 5 adapted to fit in grooves 6 and thus prevent the confronting sides of the bar from shifting. It is preferable that the ribs are alternately arranged, as shown in Fig. 3. The confronting sides of the bar are further held together by a collar 7 surrounding the neck 4 and said collar is held in position by a rivet 8 that passes through the collar and the bar. The ends of the bar are then bent outwardly and downwardly to form a yoke 9 and the depending beveled ends of said bar constitute parallel tines that can be used for digging or grubbing purposes.

One embodiment of the invention has been illustrated but it is to be understood that the structural elements are susceptible to such variations and modifications as fall within the scope of the appended claim.

What I claim is:—

A hoe made of a flat bar having the ends thereof beveled and bent upon itself to have the opposing portions thereof constitute a loop terminating in a neck with the end portions of said bar extending outwardly in opposite directions from the lower terminus of the neck and further extending downwardly providing a pair of spaced tines, and a collar surrounding the opposing portions of the bar constituting the neck, the said opposing portions of said bar constituting the neck being provided with interengaging ribs, and a rivet passing through the collar and the neck between the said ribs for securing the elements together.

In testimony whereof I affix my signature in the presence of two witnesses.

JOHN WAROCZKY.

Witnesses:
 JOHN W. CROLL,
 ANDY AZARY.

Copies of this patent may be obtained for five cents each, by addressing the "Commissioner of Patents, Washington, D. C."